United States Patent

[11] 3,573,744

[72] Inventor Livio A. Rigazio
Eatontown, N.J.
[21] Appl. No. 772,515
[22] Filed Nov. 1, 1968
[45] Patented Apr. 6, 1971
[73] Assignee Bell Telephone Laboratories, Inc.
Murray Hill, Berkeley Heights, N.J.

[54] DATA BUFFER SYSTEM FOR TRANSFERRING INFORMATION FROM A FIRST TO A SECOND STORAGE MEDIUM
22 Claims, 6 Drawing Figs.

[52] U.S. Cl. 340/172.5
[51] Int. Cl. G06f 3/06, G11c 19/00
[50] Field of Search 235/157; 340/172.5; 340/174.1

[56] References Cited
UNITED STATES PATENTS

| | | | |
|---|---|---|---|
| 2,858,526 | 10/1958 | Deutsch | 340/174 |
| 3,029,414 | 4/1962 | Schrimpf | 340/172.5 |
| 3,201,759 | 8/1965 | Kelly | 340/172.5 |
| 3,281,795 | 10/1966 | Gural et al. | 340/172.5 |

*Primary Examiner*—Paul J. Henon
*Assistant Examiner*—Melvin B. Chapnick
*Attorneys*—R. J. Guenther and James Warren Falk

ABSTRACT: A data buffer and converter is disclosed which receives information from a first storage medium such as a magnetic tape, converts it into a different format, and enters the converted data into a second storage medium, such as the memory of a stored program machine. Each entry on the tape comprises *n*-lines of *m*-bits each. The data read from each line of an entry is transferred to a different one of a plurality of *m*-bit registers. Subsequently, by means of instrumentalities including a shift register, the data from the plurality of *m*-bit registers is rearranged into a single word having *n x m*-bits and entered into the second storage medium.

INVENTOR
L. A. RIGAZIO
BY
Donald M. Duft
ATTORNEY

DATA BUFFER SYSTEM FOR TRANSFERRING INFORMATION FROM A FIRST TO A SECOND STORAGE MEDIUM

BACKGROUND OF THE INVENTION

This invention relates to a data buffer system and, in particular, to a system for facilitating the transfer of data or information from a first to a second storage medium, such as for example, from a magnetic tape to the memory of a digital processor. The invention further relates to a system that (1) reads magnetic tapes on which data is arranged in the form of plural line entries and (2) converts the data comprising each entry to a single binary word of the same bit capacity which, in turn, is entered into the processor memory. The invention still more particularly relates to a data buffer system in which data is transferred from the magnetic tape to a digital processor operating in online mode.

It is often desired in the data processing art to load new information or data into the memory facilities of stored program machines such as, for example, digital processors. This operation is typically accomplished by (1) reading magnetic tapes on which the data that is to be transferred is recorded in the form of individual plural line entries; (2) converting the data bits comprising each plural line entry into a single binary word having the same bit capacity; and (3) transferring each binary word to a unique location in the processor memory.

The transfer of information from the tape to the memory may be done either in an offline or in an online mode of the processor. The use of the offline mode, although simple and uncomplicated, is often less than ideal since the processor can perform no useful function for the duration of the transfer operation other than that of receiving the new data and entering it into its memory. The use of the online mode, although more complicated and involved, is often to be preferred since the processor is able to perform other useful work while the data from the tape is being entered. However, since priority must be given by the processor to its normal online work, only a small portion of its available time may be given to the data transfer operation. For example, a typical machine may be able to interrupt its normal work function and devote only a few microseconds every 5 milliseconds or so to the task of receiving and entering the new data.

The magnetic tape equipment is typically operated in such a manner that, after the tape transport is activated at the beginning of a data transfer operation, the tape advances continuously and data is read out until the transfer operation is completed, i.e., when all of the data in the block that is to be loaded into the processor memory has been read from the tape. In other words, the tape equipment is not operated in a start-stop manner for each line, or for each entry, and instead, is operated continuously until an entire data block is read and transferred to the processor.

Due to the continuous advancement of the tape during the data transfer operation, the entering of new data or information into memory on an interrupt basis of the processor operating in an online mode requires the provision of buffer facilities so that the data that is received from the continuously running tape may be temporarily stored and made available to the processor during each interrupt. The storage capacity of the buffer equipment must be such that it can receive and temporarily retain all of the data that is read during the interval between processor interrupts. In other words, if the interval between interrupts is 5 milliseconds, the buffer equipment must have the capacity to store the quantity of data that can be read from the tape in 5 milliseconds.

Considerations regarding the required storage capacity of the buffer are complicated by virtue of the fact that the speed of the tape is synchronized on a long term, but not on a short term basis with the operation of the processor. If the processor and the tape transport were precisely synchronized on a short term basis, the amount of data that is read during a given time interval, such as the 5 millisecond interval between interrupts, would be precisely known. This, in turn, would permit the required storage capacity of the buffer facilities to be easily determined. For example, let it be assumed that each tape entry comprises five lines of data and that the nominal speed of the tape is such that one line of data is read every millisecond. In this case, if the speed of the tape did not vary, it could then normally be expected that a complete five line tape entry would be read during the interval between each 5 millisecond processor interrupt. However, because of the short term variations in the tape speed, the amount of data that is read and received by the buffer in the interval between two successive interrupts may comprise either less than, more than, or a complete five line entry. This variation in the quantity of data that may be found in the buffer upon the initiation of each interrupt would require complicated buffer facilities if data representing only complete tape entries can be transferred from the buffer to the processor. For example, with reference to the above-specified tape characteristics, it is possible that the speed of the tape may vary in such a manner that four lines of tape data are read during a first 5 millisecond interval and then, due to a sudden increase in the tape speed, six lines of data are read during the next 5 millisecond interval. If the buffer could present the data to the processor only in the form of completed entries, it may be seen that no information would be transmitted to the processor on the interrupt following the first interval, since only four lines of tape data is then in the buffer. Two complete entries (ten lines) would then be in the buffer and presented to the processor on the interrupt following the second interval. An arrangement such as this, would require complicated and expensive instrumentalities within the data buffer since facilities would be required for (1) storing up to two complete tape entries and (2) recognizing when the data comprising a complete tape entry has been received.

BRIEF SUMMARY OF THE INVENTION

Objects

It is, therefore, an object of the invention to provide an improved system for transferring data from a magnetic tape to the second storage medium, such as for example, the memory of a digital processor.

It is a further object to provide a data transfer system having simplified buffering facilities for receiving data from a tape whose speed is subject to short term variations.

Summary Description

A solution to the foregoing problem is achieved, in accordance with my invention, by the provision of an improved data transfer system in which the data that is read and received from a tape is temporarily stored in a data buffer and, during each interrupt, is transmitted from the buffer to a shift register associated with the processor. The transmission of data out of the buffer to the shift register is effected during each interrupt regardless of whether the contents of the buffer represent, less than, more than, or a single five line tape entry. The information received from the buffer on the succeeding interrupt is stored in the shift register which, in turn, (1) converts the information comprising each tape entry into a binary word of the same bit capacity and (2) transmits to the processor the binary words representing the successive entries read from the tape.

The data buffer of my invention contains a plurality of buffer registers each of which can store one line tape data. As the tape is read, the data from the first line is entered into a first register and the data from the subsequent lines is entered sequentially, one at a time, into the remaining registers. During each processor interrupt, the contents of the buffer registers currently containing data are transmitted to the shift register sequentially, register by register, in the same order as the data was read from the tape.

The following description continues with the assumption that each tape entry contains five lines of data. Also, each line is assumed to contain eight data bits (excluding a parity bit in each line). Thus, a complete entry contains 8×5 or 40 data bits.

In accordance with a first embodiment of my invention, if the contents of the shift register following a processor interrupt constitute a single five line tape entry and no more, the entry is promptly transferred in parallel form as a single 40-bit binary word from the shift register to the processor which, in turn, enters it into an appropriate spot in its memory. The information in the shift register will comprise a single tape entry in instances in which both of the following conditions are met: (1) the tape was running at its assigned speed of one line per millisecond so that five lines, i.e., a complete tape entry was read during the preceding 5 millisecond interval between interrupts and (2) the first of the five lines read is the first line of an entry.

If the quantity of data received by the shift register during a processor interrupt comprises more than a single tape entry, that portion thereof that constitutes a single entry is promptly transferred as a single binary word to the processor and, in turn, to its memory. The remaining contents of the shift register comprise the first line of the next entry, i.e., the entry following the one that has been transferred from the shift register to memory. This information is temporarily left in the shift register. Subsequently, by the time the next interrupt occurs, the information comprising the remainder of the entry is received and added to that portion thereof already in the shift register. The newly completed entry is then transferred as a single binary word to the processor memory.

With respect to the foregoing, the shift register would receive information constituting more than a single tape entry only if the speed of the tape increases so that more than five lines of data were read during the preceding 5 millisecond interval. It has been assumed that the tape is nominally read at the rate of five lines every 5 milliseconds but, due to short term variations, it is possible that a minimum of four lines and a maximum of six lines may be read. Based on these assumption, it is possible that six lines of data will be received by the register on an interrupt following a period during which the tape was running faster than its rated speed. The first five lines received by the shift register represent a complete tape entry, while the sixth line represents the first line of the next entry. As described, the five lines representing a complete entry are promptly transferred from the shift register to the memory. The information representing the first line of the next entry remains in the shift register until the next interrupt at which time the information representing the remainder of the entry is received and transferred as a single binary word to memory in the manner described.

If the tape runs at less than its rated speed during any 5 millisecond interval between interrupts, only four rather than five lines of data will be received by the buffer registers, and the shift register on the next interrupt will receive the four lines of the data currently in the buffer registers. Since this data represents less than a complete tape entry, it remains in the shift register until the remainder of the entry is received on the next interrupt, and in the same manner as already described, transferred as a single binary word to the processor memory.

The foregoing paragraphs describe how the five data bytes comprising a complete entry are received by the shift register, converted to a 40-bit word, and promptly transferred via the processor to memory. This mode of operation is advantageous in that a shift register of a limited size may be used. An accompanying disadvantage, however, is the fact that facilities must be provided for detecting the presence of a completed entry in the shift register so that a determination may be made regarding when a transfer operation to the processor should take place.

In accordance with an alternative embodiment of my invention, a shift register is provided that has the capacity to store all of the tape data that is received from the time the tape transport is started until it is subsequently stopped. In accordance with this alternative embodiment, a block of data comprising a plurality of entries is read and entered, via the data buffer, into the shift register. The tape transport is then stopped, and the entries in the shift register are subsequently transferred a 40-bit word at a time via the processor to memory.

It has already been mentioned that the data that is read from the successive lines of a tape is entered sequentially into different ones of a plurality of individual buffer registers with each register having the capacity to receive and temporarily store one line of data. The entry of the information from the successive lines of the tape to successive ones of the buffer registers is accomplished with the aid of a distributor which, upon the beginning of a data transfer operation, enters the data read from the first line of the tape into a first buffer register and, by then advancing its operative state one position for each line read from the tape, enters the data from the subsequently read lines into the remaining buffer registers in sequence.

Facilities are provided so that the distributor does not receive data from the tape while it is in the process of advancing to its next operative position. Facilities are also provided so that tape data is not inadvertently lost or mutilated if it is read during an interrupt as the current contents of the buffer registers are transmitted to the shift register. If any information is read from the tape during this period, it is temporarily stored in an auxiliary buffer register until the termination of the interrupt. At that time, the data is transferred from the auxiliary register to the first buffer register. In this case, the data contained in the first line of the tape read following the interrupt is applied by the data distributor to the second, rather than to the first buffer register.

In view of the above, it may be seen that the data buffer provided in accordance with my invention is advantageous in that it provides an improved and simplified arrangement for transferring data to a stored program machine in instances in which the quantity of data available at each interrupt is not fixed and instead may vary within predetermined limits.

Features

A feature of the invention is the provision of a data buffer system for transmitting data from a tape to a digital processor operating in an online mode.

A further feature is the provision of a data buffer for receiving information from a tape in a line-by-line manner and for periodically transmitting the information to a shift register associated with the processor.

A further feature is the provision of facilities in the data buffer for periodically transmitting to the shift register whatever quantity of data may have been received from the tape during a preceding specified time interval.

A further feature is the provision of facilities including a shift register for receiving varying quantities of information in a line-by-line manner from buffer registers, for converting this information from its line-by-line form to a single binary word and for transmitting the binary word in parallel form to the memory of a digital processor.

These and other objects and features of my invention will become more apparent upon a reading of the following description thereof taken in conjunction with the drawing in which:

FIG. 1 discloses a system illustrating the broader aspects of my invention;

FIGS. 2A and 2B, when arranged as shown on FIG. 3, disclose further details of a system embodying my invention;

FIG. 4 discloses an alternative arrangement of a system embodying my invention; and FIG. 5 comprises a timing diagram illustrating the nature of and relationship between the various control pulses used in the system of FIGS. 2 and 4.

DETAILED DESCRIPTION–FIG. 1

Figure 1:
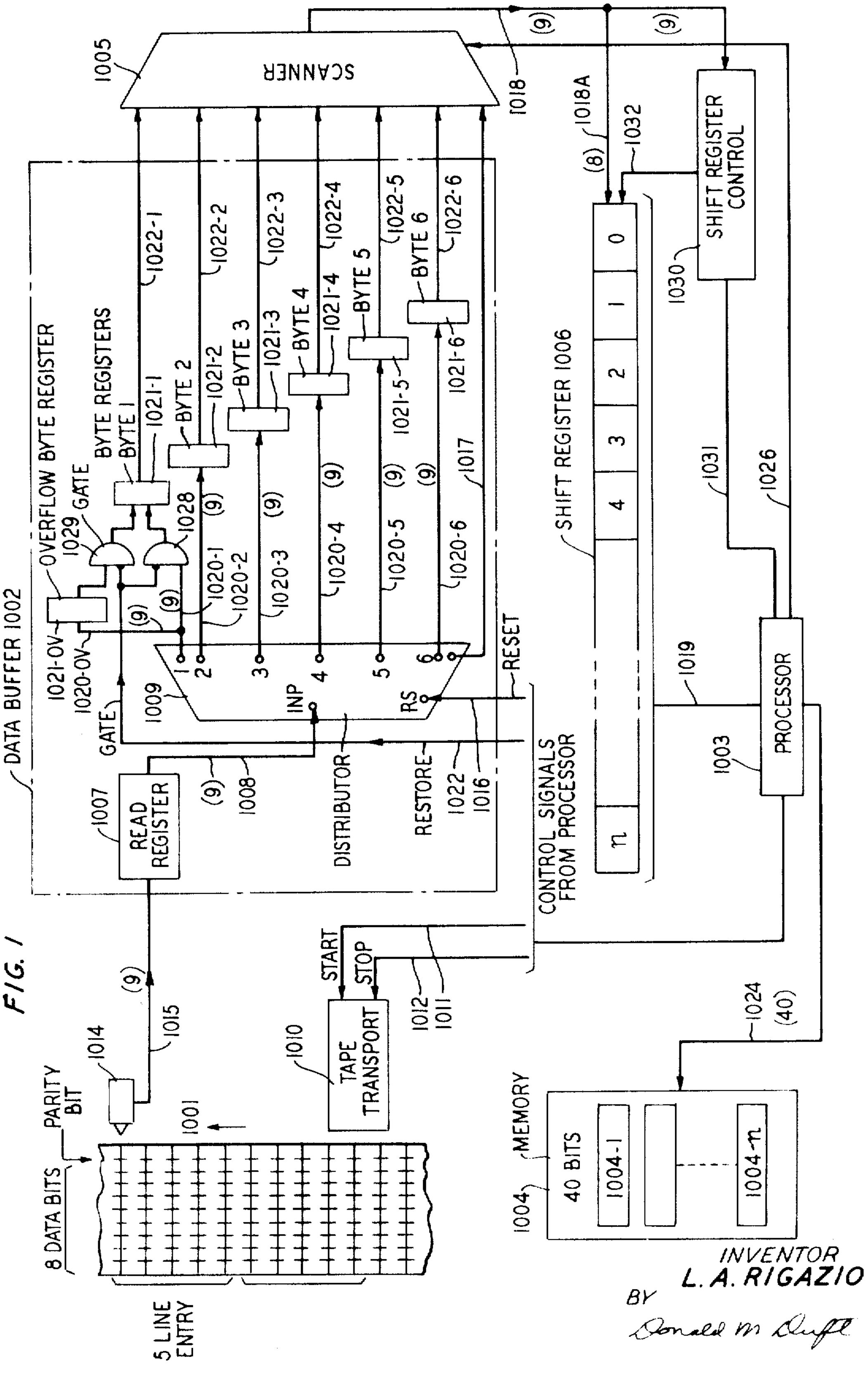

FIG. 1 discloses my invention in a manner which facilitates an understanding of its broader aspects. Specifically, shown on FIG. 1 is a tape 1001, a data buffer 1002, a processor 1003, and a memory 1004 having memory cells or addresses 1004–1 through 10004–n. The purpose of the system of FIG. 1 is to transfer data recorded on the tape to the memory under control of the processor. During the transfer operation, the tape data is read, applied to the data buffer, temporarily stored in the buffer, and periodically applied via a scanner 1005 and a shift register 1006 to the processor. The processor and the memory together may comprise a portion of a data processing system or any other type of stored program controlled system, such as for example, a stored program controlled switching system. The other elements that would normally comprise a system of this type are not shown on FIG. 1 since they comprise no part of my invention.

The processor normally performs its functions under the control of the data and program information in memory 1004. However, it is desirable from tim to time to update or change the information in memory. This is done by recording the new information on the magnetic tape and by using the system of FIG. 1 to transfer it via the processor to the memory. As already mentioned, the tape data is transferred to the memory while the processor is operating in an online mode. Thus, it may be assumed that the data processing system of which the processor and the memory are a part continues to perform its assigned functions before, during, and after the transfer of data from the tape to the memory takes place.

As may be seen from FIG. 1, the tape is of the nine-track type with the first eight-bits in each line representing data and with the last bit representing a parity bit. It is assumed in the present description that parity is of the "odds 1" type. The data on the tape further comprises 40-bit entries which are divided into five lines of eight-bits each (excluding the parity bit in each line). It is desired during the data transfer operation to convert each such 40-bit entry from its line-by-line format on the tape to a single 40-bit binary word and then to enter each binary word into an appropriate spot in memory 1004.

The processor initiates a data transfer operation by determining that new information is to be loaded into memory and by transmitting a start signal over conductor 1011 to the tape transport 1010 which (1) responds to the signal, (2) actuates a motor within the transport, and (3) causes the tape to advance at a predetermined speed past the reading head 1014. It is assumed that the tape travels upwards as shown on FIG. 1 under control of the tape transport during the reading operation.

The single tape head shown as element 1014 contains the necessary pickup coils to read the information or data stored in all nine tracks of the tape. This data is transmitted over the nine conductor path or cable 1015 to the read register 1007 within the data buffer. The symbol (9) adjacent the conductors 1015 indicates the number of data bits that are transmitted over the cable. A corresponding symbol is used with respect to certain of the other conductor paths on the drawing to show the number of data bits that are transmitted thereover.

Each line of data entered into read register 1007 is applied over path 1008 to the input terminal (INP) of distributor 1009. The distributor is of the conventional type in that it has a single input and a plurality of outputs. Its function is to receive and distribute the successively read lines of tape data to the various ones of its output terminals in sequence. The conductors 1020-1 through 1020-6 interconnect the six output terminals of the distributor with a corresponding one of the six byte registers 1021-1 through 1021-6. The output of each byte register is connected over one of paths 1022-1 through 1022-6 to scanner 1005.

The distributor is normally in its reset or idle position in which its input is effectively interconnected with its output terminal 1. The distributor operates in such a manner that it applies any data received by its input to the output terminal representing the current operative position of the distributor. Immediately following the reception of the data signals representing a first line read from the tape, the distributor advances one position and interconnects its input terminal with its next output terminal. The distributor similarly advances one step as each remaining line of a tape entry is read, received, and entered into a byte register. The distributor may be reset to its normal position, position 1, in response to the receipt of a reset signal over conductor 1016 from the processor. Conductors 1017 interconnecting the distributor and the scanner keeps the scanner continuously advised as to the current operative position of the distributor.

With reference to the foregoing, the following paragraphs describe the manner in which the data read from the tape is temporarily stored in the data buffer 1002, and periodically transmitted via the scanner 1005 to the shift register 1006. The data read from the first line of a tape entry at the beginning of a data transfer operation is transmitted over path 1015 to the read register 1007 where the data is temporarily stored. The distributor is currently in its normal or reset position in which its input is connected to its output terminal 1. Thus, the information in the read register is applied over path 1008 to the distributor and, in turn, to its output terminal 1. The information is further applied over conductor path 1020-1 to byte register 1021-1.

As subsequently described in connection with FIGS. 2, the information currently in register 1007 and representing one line of a tape entry remains there only for the period of time required for the information to be entered into byte register 1021-1 via the distributor. Shortly afterwards (1) register 1007 is reset in preparation of the reception of the next line of tape data, and (2) the distributor is advanced to its next operative position in which the input terminal is interconnected with output terminal 2 which is connected to conductors 1020-2 extending to byte register 1021-2.

Subsequently, the information on the next line of the tape is read, transferred to read register 1007, and from there, applied over conductor path 1008 to the input terminal of the distributor. The distributor is now in its second position, and therefore the information is extended to its output terminal 2 from which it is transmitted over conductors 1020-2 to byte register 1021-2. Shortly thereafter, read register 1007 is reset and the distributor advances one step so that its input terminal is connected to its output terminal 3.

The system of FIG. 1 continues to operate in a manner similar to that already described so that as the subsequent lines of the tape are read, the data contained in each line is temporarily stored in read register 1007, and applied via the distributor to one of the byte registers 1021-3 through 1021-6.

The tape information received by the byte registers is periodically transferred via the scanner and shift register to the processor. The processor controls the time at which each such transfer operation occurs and at that time, it transmits a control signal to the scanner over conductor 1026 to cause it to transfer the contents of the various byte registers sequentially to the shift register over conductors 1018. The distributor is reset during the scanning operation in order that the data contained in the subsequent lines of the tape may be entered into the byte registers after the scanning operation has been completed.

The nominal speed of the tape is such that a line of data passes the read heads once every millisecond. The processor initiates a data transfer interrupt once every 5 milliseconds and at that time it controls the scanner so that the information then in the byte registers is scanned and transmitted sequentially byte-by-byte to the shift register. If the tape could be held with precision to its nominal speed of one line per millisecond, five lines of tape would be read each five millisecond, byte registers 1021-1 through 1021-5 would be filled sequentially during the 5 millisecond interval between data transfer interrupts, and a complete five line tape entry would be available on each interrupt for transfer from the first five byte registers to the shift register. The shift register, in turn, could immediately transfer the received information as a single 40-bit word to the processor for entry into an appropriate spot in memory 1004.

The ideal conditions described in the preceding paragraphs regarding the speed of the tape and the transfer of a complete five line tape entry from the byte registers to the shift register on each interrupt are not always obtainable. The reason for this is that although the nominal rate of speed of the tape is one line per millisecond, the tape is subject to short term speed variations which permit either 4, 5, or 6 lines to be read each 5 milliseconds. This, in turn, causes either 4, 5, or 6 of the byte registers to be filled during the 5 millisecond interval between two successive interrupts. This variation in the tape speed greatly complicates matters by precluding the assured transfer of a complete tape entry on each interrupt from the data buffer to the shift register.

The system provided in accordance with my invention as shown on FIG. 1 minimizes, to the extent possible, the foregoing complications caused by variations in the tape speed and provides for the efficient temporary storage of the data read from the tape and for its conversion from a 40-bit line-by-line format to a single 40-bit binary word. This is accomplished by transferring the contents of all filled byte registers from the data buffer to the shift register on each data transfer interrupt. This transfer is accomplished on each interrupt regardless of whether four, five, or six byte registers have been filled as a consequence of four, five, or six lines of tape, respectively, having been read during the preceding 5 millisecond interval. The shift register receives the data in a line-by-line manner from the buffer, temporarily stores it, and then transfers each received entry to the processor and, in turn, to the memory as a single 40-bit binary word.

It has already been mentioned that my invention may alternatively be embodied either in a system in which the shift register has the capacity to receive an entire block of data containing many entries, or in a system in which the shift register has a more limited capacity. In accordance with the first alternative, data is received and stored in the shift register until an entire data block has been read. At that time, the shift register contents are transferred out on an entry-by-entry basis, a 40-bit word at a time, to the processor. My invention may also alternatively be embodied in a system in which the shift register has more limited capacity, and, therefore, must promptly transfer each 40-bit word to the processor as soon as the five bytes constituting the word are received from the scanner.

Figure 2A:
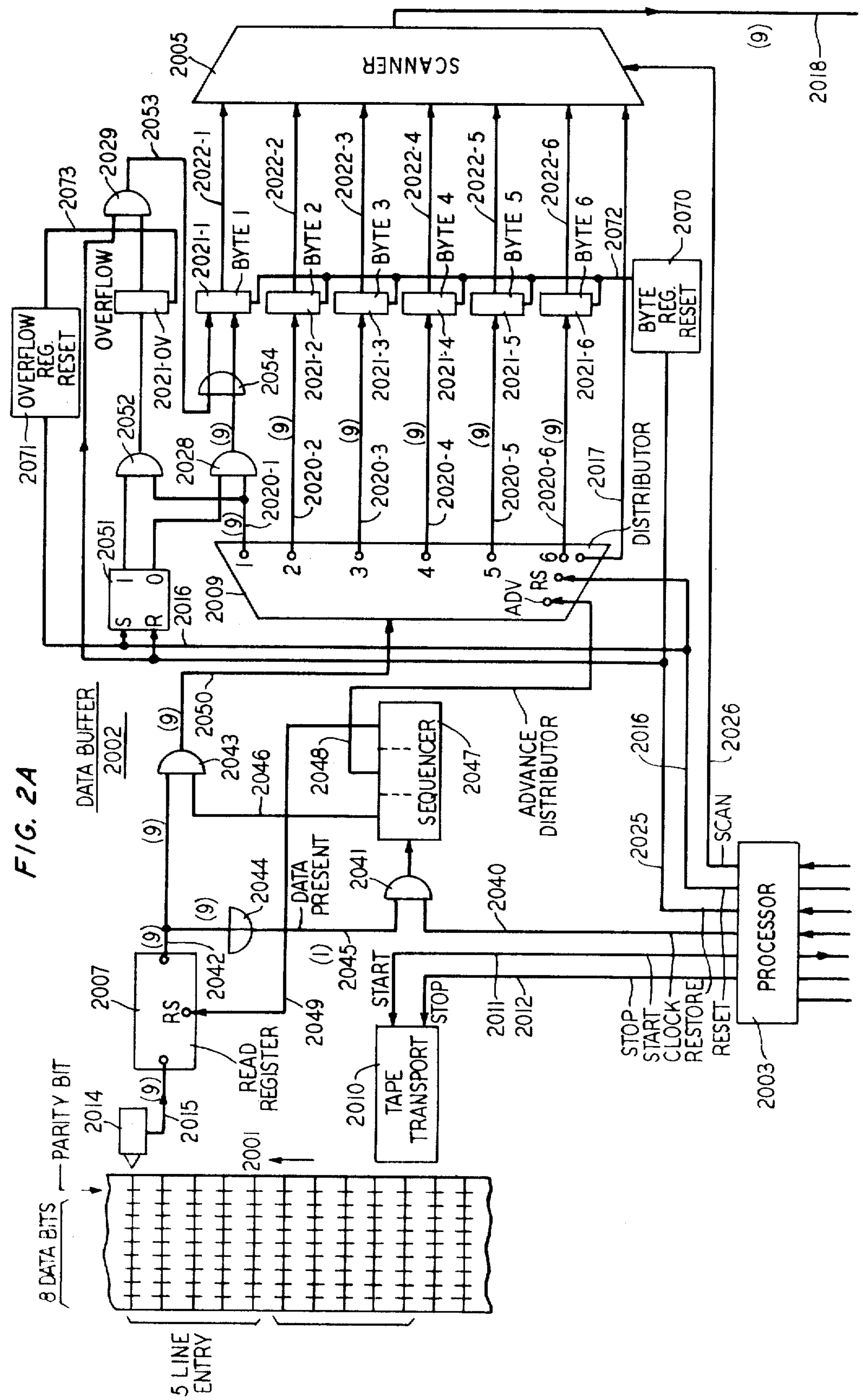
Figures 2B, 3:
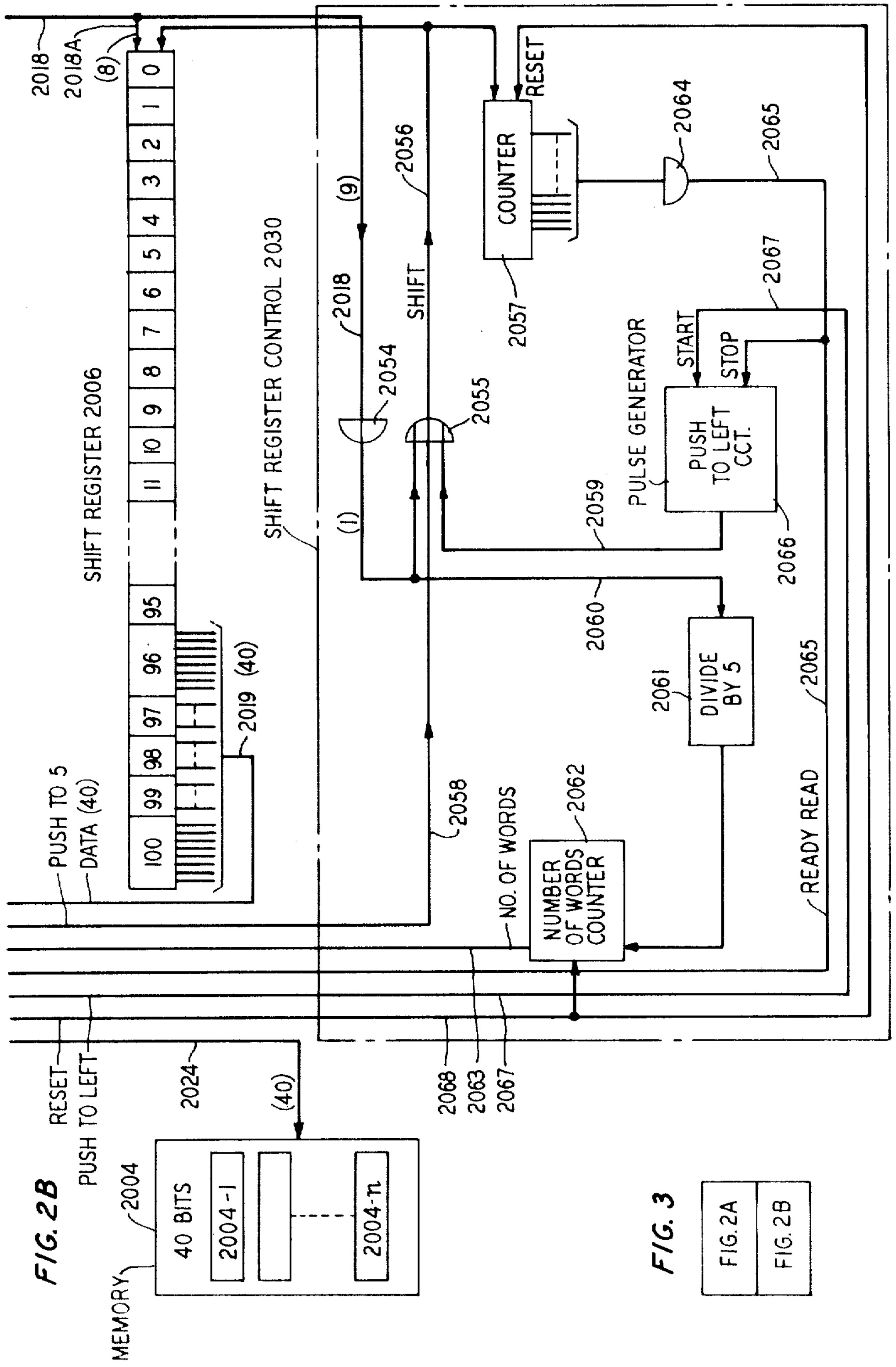
Figure 4:
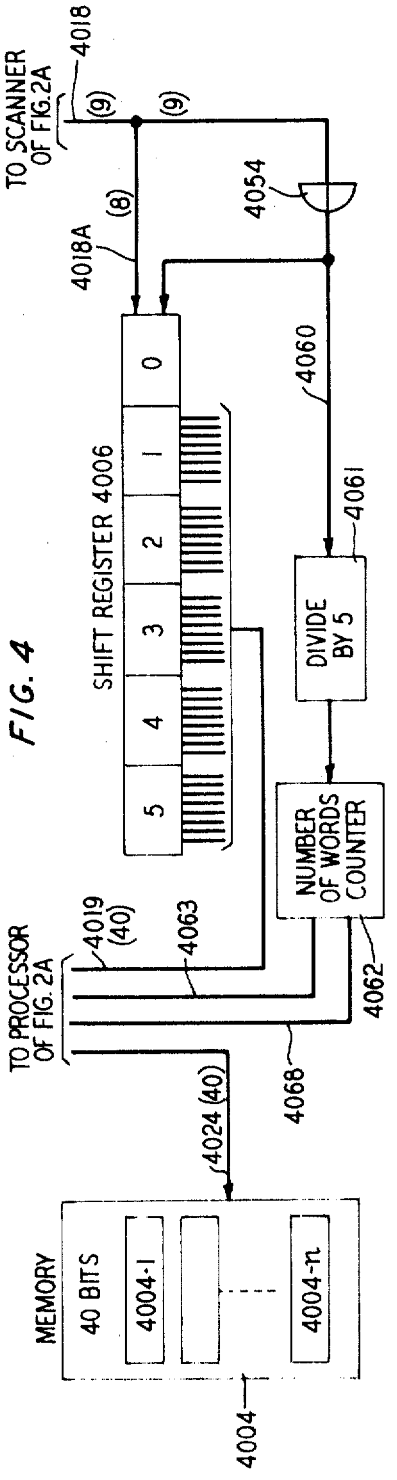

The detailed embodiment shown on FIGS. 2A and 2B illustrates a system in which the shift register has the capacity to store a complete block of data. FIG. 4 discloses a system in which the shift register has only a limited capacity and promptly transfers each completed entry to the processor as soon as it is received. The system shown in FIG. 1 is applicable to both modes of operation insofar as the shift register is concerned since the primary purpose of FIG. 1 is to convey a general understanding of the broader aspects of my invention. Therefore, the distinctions between the two alternative shift register arrangements are best understood with respect to the detailed disclosure of FIGS. 2A and 2B and FIG. 4, rather than with respect to FIG. 1.

The short term variations in the speed of the tape and the resultant variation in a number of byte registers that are found to be filled on each data transfer interrupt are of little concern in a system in which the shift register has the capacity to store an entire block of data. The reason for this is that a data block consists of an integral number of complete tape entries and therefore, the presence of an entire data block in the shift register automatically precludes the presence of any incomplete entries in the register. In accordance with this mode of operation, the contents of the shift register are transferred to the processor over conductor path 1019 after the entire data block has been received and the tape transport has been stopped. The processor and the shift register control 1030 together control the circuit operations required to effect the transfer of the shift register contents to the processor.

The number of byte registers whose contents are applied to the shift register on an interrupt is of more concern in a system in which the shift register has a limited capacity and must transfer each complete entry to the processor promptly after it is received from the scanner. With reference to such a system, the following paragraphs describe the manner in which the transfer of information into and out of a shift register is effected for each of the various tape speeds that may be encountered.

Let is first be assumed that the tape runs precisely at its normal speed for the entirety of a 5 millisecond interval between interrupts. In this case, five byte registers are filled, i.e., byte registers 1 through 5, and the contents of these five registers are transferred sequentially via the scanner over conductors 1018 and 1018A to the shift register during the next data transfer interrupt. Each slot or segment of the shift register shown in FIG. 1 can store the eight data bits contained in a single line of the tape. As is described in connection with FIG. 2, the ninth bit of each line, the "odds 1" parity bit, is transmitted over conductor path 1018 by the scanner along with the data bits, but conductors 1018A apply only the eight data bits to the shift register. The information is entered into shift register slot 0 via conductors 1018A. Immediately upon the entry of eight bits of data into slot 0, the eight bits are pushed to the left one step to slot 1 by the control circuit 1030. As other bytes are received by slot 0 and promptly transferred to slot 1, the bytes already in the register are moved to the left one step as each additional byte is received. After five lines of data have been received, the contents of byte register 1 are stored in shift register slot 5 and the contents of byte registers 2 through 5 are in slots 4 through 1. The contents of slots 5 through 1 now comprises the 40-bits of a complete tape entry and therefore, the shift register immediately transmits them over conductors 1019 to the processor which, in turn, enters them into an appropriate spot in memory.

Let is next be assumed that the tape runs fast during a 5 millisecond interval and that six lines of the tape are read and entered into the six byte registers 1021-1 through 1021-6. The contents of these registers are sequentially transferred via the scanner to the shift register on the next data transfer interrupt. The first five of these six bytes of data represents the 40-bits of a complete tape entry. Therefore, as soon as the five bytes are recieved and entered into slots 5 through 1, they are transferred out as a single 40-bit binary word to the processor and, in turn, to the memory. This transfer occurs before the sixth byte is received. When the sixth byte is received, it is entered into slot 1. This byte represents the first line of the next tape entry and it remains in slot 1 of the shift register until the next data transfer interrupt occurs and the data bytes comprising the rest of the entry are received. Thus, let it be assumed that the tape runs slow during the next five millisecond interval so that only four lines of the tape are read. In this case, only byte registers 1 through 4 of the data buffer are filled, and, during the course of the next processor interrupt, the contents of the four byte registers are applied to the shift register and entered into slots 1, 2, 3, and 4 respectively. The byte that was initially in slot 1 from the previous interrupt step is advanced to the left one position as each additional byte is received. The data that is now in slots 1, 2, 3, and 4 comprises lines 2 through 5 of the same tape entry whose first line was entered into slot 1 during the previous interrupt. Therefore, the contents of shift register slots 1 through 5 once again comprise a complete 40 bit entry that may be transferred via the processor to the memory.

Let it be assumed that the tape also runs slow for the next five millisecond interval and that, once again, only four lines of tape are read and the information thereof entered into byte registers 1 through 4. The contents of these four registers are transmitted sequentially to the shift register on the next interrupt and entered into slots 1 through 4. These four bytes comprise the first four lines of the next tape entry. This information is not transferred to the processor at this time and instead, is temporarily stored in the shift register until the next following interrupt when the last line of the entry is recieved along with a plurality of lines from the next entry. Let it be assumed that four bytes of information are again received on the next interrupt. As the first of the four bytes is received and entered into slot 1, the data that was priorly in slots 1 through 4 is shifted leftwards to slots 5 through 2. The contents of slots 5 through 1 now comprise a complete tape entry and they are therefore transferred as a 40-bit binary word to the processor. The last three of the four bytes are next received and entered into slots 1 through 3. There three bytes represent the first three lines of the next entry.

The operations within the shift register would be essentially the same if five bytes had been received instead of 4 on the last interrupt. The only difference would be that the last four bytes received would be in shift register slots 1 through 4, after the first byte received and the prior contents of the register had been transferred to the processor as a 40-bit word.

In the event that six lines, rather than four or five, had been read, the contents of byte registers 2 through 6 would be in shift register slots 1 through 5, respectively after the first received byte and the prior contents of the shift register had been transferred to the processor. The new contents of the shift register slots 1 through 5 would then represent the last five lines of the last complete entry to be read and they would promptly be transferred to the processor.

The scanning operation takes a finite period of time during which the contents of the byte registers must remain fixed so that their contents may be read by the scanner and transferred to the shift register. This period of time is sufficiently long that the possibility exists that information representing the next line of tape may be recieved from the read register 1007 before the scanning operation is completed. The distributor is reset to its first position prior to the scanning operation and the reception of any tape data at this time would normally be entered into byte register 1. In accordance with my invention I provide facilities for temporarily storing any tape data information that may be recieved at this time in an auxiliary or overflow byte register until the completion of the scanning operation. At that time, the contents of the auxiliary register are transferred to byte register 1.

Normally, the data signals appearing on output terminal 1 of the distributor are transmitted over conductors 1020-1 through gates 1028 to the lower input of byte register 1. The signals applied to conductors 1020-1 pass through gates 1028 unless an inhibit potential is applied to their upper input by conductor 1022. Normally this conductor has no potential on it and as a result, the signals applied to conductors 1020-1 are free to pass through gates 1028. However, during the scanning operation, a signal is applied by the processor to conductor 1022 and extended to the inhibit terminal of gates 1028 and 1029.

Let it next be assumed that tape data is received from read register 1007 during the course of a scanning operation. Since the distributor has been reset to its initial position, this data passes through the distributor, is applied to its output terminal 1 and, in turn, to the overflow byte register 1021–OV. Both of gates 1029 and 1028 are currently inhibited by the signal on conductor 1022, and therefore, the contents of register 1021-1 are not disturbed during the scanning operation.

The processor determines when the scanning operation is concluded, and then removes the inhibit potential from conductor 1022 and in turn, from gates 1028 and 1029. This permits the contents of overflow register 1021–OV. to pass through gate 1029 and into byte register 1. The distributor is advanced in response to the termination of the reception of the information that is entered into the overflow register so that by the time the data representing the next line of the tape is received, the contents of the overflow register have been transferred to byte register 1, the distributor has advanced to its position 2, and the information from the next line of the tape is entered into byte register 2.

The operations continue in a manner similar to that already described as the subsequent lines of the tape are read and the information thereon is entered into the byte registers sequentially in a line-by-line manner.

DESCRIPTION OF FIGS. 2A AND 2B

FIGS. 2A and 2B, when arranged as shown in FIG. 3, discloses additional details of my invention. Each element on FIGS. 2A and 2B that corresponds to an element on FIG. 1 is designated in a manner to indicate the correspondence. Thus, the tape is designated as element 1001 on FIG. 1 and as element 2001 on FIG. 2A. Similarly, processor 1003 on FIG. 1 comprises element 2003 on FIG. 2A. However, a one-for-one correspondence between the elements of FIGS. 2A, 2B and FIG. 1 is not always possible since the embodiment shown on FIGS. 2A and 2B is more detailed and contains many elements which are not separately shown on FIG. 1. The elements on FIGS. 2A and 2B have been designated in such a manner that an element bearing a designation number between 2001 and 2039 has a one-for-one correspondence with an element on FIG. 1. Each element bearing a designation number of 2040 or greater does not directly correspond to any element separately shown on FIG. 1.

The embodiment of FIGS. 2A and 2B is similar to that of FIG. 1 in that is discloses a magnetic tape 2001, a data buffer 2002, a processor 2003, a memory 2004 having a plurality of memory locations 2004–1 through 2004–*n*. In the same manner as described for FIG. 1, the function of the system shown on FIGS. 2 is (1) to read the data recorded on the tape, (2) to temporarily store it in the data buffer, and (3) to periodically transfer it from the buffer via a scanner 2005 to shift register 2006 where each entry is converted from its line-by-line format to a single 40-bit binary word that is transmitted to the processor and, in turn, entered into an appropriate slot in memory. The system of FIGS. 2 is further similar to that of FIG. 1 in that the tape information is temporarily stored in the read register 2007 a line at a time, is transferred from the read register to the input of the distributor 2009, is entered by the distributor into byte registers 1 through 6 sequentially a line at a time and, during each processor interrupt, is transferred by scanner 2005 from the byte registers to shift register 2006. The additional details that are shown on FIGS. 2A and 2B, over and above those shown on FIG. 1, pertain primarily to the apparatus and equipment that (1) generates the timing and control pulses required to transfer data from the tape to the byte registers in an ordered fashion and (2) controls the operation of the shift register to permit it to receive data from the scanner and to convert it into parallel form for transmission to the processor.

As already mentioned in connection with FIG. 1, the processor and the memory comprise a portion of a continuously operating data processing or stored program control system in which the processor performs the functions and operates under control of the instructions and data contained in the memory as well as under control of signals and information returned to the processor from peripheral circuits of the controlled system. The processor of FIGS. 2 continues to control the operation of the system with which it is associated both before, during, and after each operation in which data is transferred from the tape to the memory. In other words, during each data transfer operation, the processor continues its control of the system with which it is associated and is therefore able to devote only a small percentage of its real time to the task of transferring data from tape to memory. In the presently disclosed embodiment of my invention, it is assumed that the processor interrupts its online system activities once every 5 milliseconds in order to devote a few microseconds of its real time to the data transfer operation.

A data transfer operation is initiated for the system of FIGS. 2 when the processor applies a start signal to conductor 2011 to cause the tape transport to advance the tape at the speed required for a reading operation. The nominal speed of the tape during the reading operation is one line per millisecond, and the forward motion of the tape is continuous until the tape transport receives a stop signal from the processor over conductor 2012.

The processor 2003, as do all stored program machines, contains circuitry for generating the many timing and control pulses required for its operation in an ordered manner. These pulses are typically generated under control of a single source of clock pulses, such as for example, a crystal oscillator. The various timing and control pulses generated by the processor and applied to the different circuit elements of FIGS. 2 are illustrated on FIG. 5. The function of various pulses as well as the time relationship therebetween is set forth in the following paragraphs in connection with the detailed description of the operation of the system of FIGS. 2. The only pulse that need be mentioned at this time is the clock pulse which is generated every 10 microseconds by the processor and is applied over conductor 2040 to the lower input of AND gate 2041. As subsequently described, this clock pulse controls the ordered transfer of the information from the tape to the byte registers.

The information on the tape is read by head 2014 and applied a line at a time over conductors 2015 to read register 2007. Each line of information is stored in the register only for the time required for it to be applied forward to the distributor for entry into an appropriate one of the byte registers. The transfer of the contents of the read register to a byte register is accomplished in a few microseconds, i.e., long before the read register receives the next line of data read from the tape.

In order to understand the operation of the system of FIGS. 2A and 2B, let it be assumed that the tape has been brought up to the speed required for a read operation and that the first line of a initial entry in a block has been read and entered into read register 2007. Immediately upon its receipt signals representing the register contents are applied to conductors 2042 which extend to the upper input terminal of the nine AND gates shown as element 2043. Conductors 2042 are also extended to the input of OR gate 2044. This gate may comprise either (1) a single nine input OR gate with each of the nine conductors in path 2042 being connected to one of the inputs of the gate; or (2) nine single input OR gates having a common output.

The lower input of gates 2043 are connected by conductor 2046 to the output of the first section of sequencer 2047. The sequencer comprises a circuit which generates three precisely timed output pulses in response to the reception of a pulse at its input. The output of AND gate 2041 is connected to the input of the sequencer and whenever the sequencer receives a pulse from the AND gate, it generates three output pulses which are spaced apart from each other in time by one microsecond. The first output pulse is applied from the first section of the sequencer to output conductor 2046; the second output pulse is applied from the second portion of the sequencer to output conductor 2048; and the third output pulse is applied from the third section of the sequencer to output conductor 2049.

The O-ring of the signals on the nine conductors 2042 by gate 2044 provides a signal on conductor 2045 that indicates the presence of data (other than all zeros) in the read register. This data present signal on conductor 2045 is extended to the upper input of 2041. During the reception of the data present signal by AND gate 2041, the reception of the next clock pulse on conductor 2040 turns the gate on and permits the clock pulse to pass therethrough to the input of the sequencer. The input pulse to the sequencer may therefore be considered to be the clock pulse even though it passes through the AND gate 2041 only when data is present in the read register. The sequencer responds to the reception of the clock pulse at such times and generates three sequential output pulses at 1 microsecond intervals.

Figure 5:
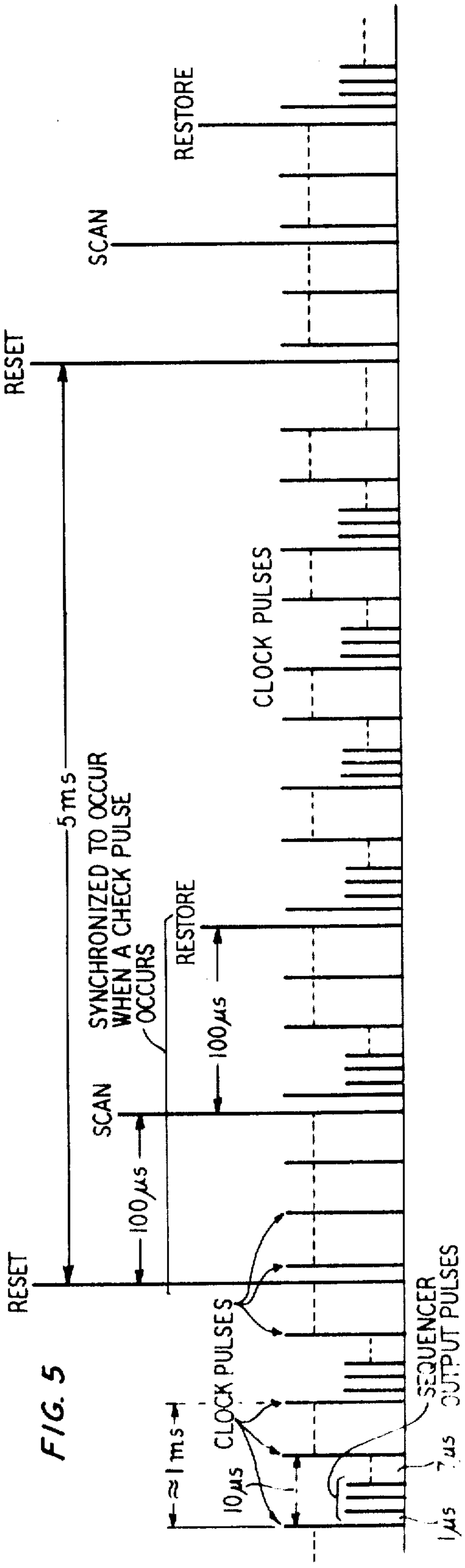

The relationship between the clock pulse and the three output pulses from the sequencer is illustrated on FIG. 5 where a plurality of clock pulses are shown each of which is spaced apart by ten microseconds. Following certain ones of the clock pulses, there are three output pulses generated by the sequencer. The application of a pulse from the sequencer to conductor 2046 enables AND gates 2043 and permits the contents of the read register to pass through gates 2043 to conductors 2050 extending to the input of the distributor. The distributor is in its first position at this time. Therefore, the data it now receives is extended therethrough to its output position one and from there, over conductors 2021-1, through gates 2028, to byte register 2021-1. AND gates 2028 are in an enabled state at this time since flip-flop 2051 is currently in a reset state in which its zero output is high extending to the upper input of gates 2028. This high partially enables the gates and permits the data applied to the first output terminal 1 of the distributor to be extended to byte register 1.

One microsecond following the generation of its first output pulse, the sequencer generates and applies an output pulse to conductor 2048 extending to the advance (ADV) terminal of the distributor. This conductor is connected to the circuitry within the distributor which causes it to advance its operative position one step in response to each pulse received over conductor 2048. The pulse that is now received by the distributor from conductor 2048 advances it from its first to second position.

Three microseconds following the reception of the clock pulse, the sequencer generates and applies an output pulse to conductor 2049 extending to the reset (RS) terminal of read register 2007. The reception of this pulse resets the register and prepares it for the reception of the next line of data read from the tape The resetting of the register causes binary 0's to appear on all of its output conductors 2042 and, as a result, the signal present potential is removed from conductor 2045 extending to the upper input of AND gate 2041. This turns off the gate and precludes any further clock pulses on conductor 2040 from passing therethrough and being applied to the sequencer for the time being.

Approximately 1 millisecond following the reading of the first line of a tape entry, the second line is read and the information thereon entered into read register 2007. The output signals on conductors 2042 representing the newly received contents of the register cause a data present signal to be applied to conductor 2045 and the upper input of AND gate 2041. With this signal on the upper input of the AND gate, the next clock pulse passes through the gate to the input of the sequencer which, once again, generates three output pulses at 1 microsecond intervals. In the same manner as before, the first sequencer output pulse is applied to conductor 2046 to turn on AND gates 2043 and thereby permit the signals on path 2042 from register 2007 to pass through the gates, to the input of the distributor, through the distributor to its output terminal 2, and over conductors 2020-2 to byte register 2. The second output pulse generated by the sequencer is applied to conductor 2048 to advance the distributor one step to its position 3. The third output pulse of the sequencer is applied to conductor 2049 to reset the read register 2007.

The resetting of the register removes the data present signal from conductor 2045. This disables AND gate 2041 and precludes further clock pulses on conductor 2040 from passing through the gate to the sequencer until the data read from the third line of the tape entry is entered into read register 2007.

The operations already described are repeated as the successive lines of the tape are read, entered into read register 2007 one line at a time, and, in turn, transferred via the distributor to the byte registers. Since the nominal speed of the tape is one line per millisecond, five lines of the tape should be read and entered into byte registers 1 through 5 during the 5 millisecond interval between interrupts. However, as already mentioned due to short term variations in the tape speed, it is possible that a minimum of 4 lines of tape and a maximum of 6 lines may be actually read during any given 5 millisecond interval. Because of this either the first four, the first five, or all of the byte registers may contain data at the time a processor interrupt occurs. The manner in which the data contained in the byte registers for these three varying conditions is transferred to the shift register and, in turn, to the processor is described in the subsequent paragraphs.

A data transfer interrupt is initiated when the processor applies a reset pulse to conductor 2016 extending to both the reset terminal of the distributor and the set (S) terminal of flip-flop 2051. This pulse reset the distributor back to its position 1 from the operative position to which it is advanced during the 5 milliseconds interval preceding the interrupt, i.e., positions 4, 5, or 6. The distributor is reset at this time in order that the contents of the byte register may be examined a few microseconds later by the scanner without the possibility of new information coming from the read register.

A scan pulse is applied to conductor 2026 by the processor and extended to the scanner approximately 100 microseconds following the reset pulse on conductor 2016. This 100 microsecond interval permits the byte register contents to stabilize at the scanner before the scanning operation is initiated. The pulse on conductor 2026 initiates all of the operations within the scanner that are required for that circuit to examine the contents of the byte registers and to transfer the information stored therein sequentially to the shift register over conductors 2018. Since the distributor is in its position 1 at this time, it is desired to prevent the current contents of byte register 1 from being changed and overridden by new data from the read register. The manner in which this is accomplished is described in the following paragraphs.

Normally the data applied to output terminal 1 of the distributor passes over conductors 2020-1 and through AND gates 2028 and OR gates 2054 to byte register 1. The data from distributor output terminal 1 normally passes through the AND gates 2028 since the flip-flop 2051 is normally in a reset condition in which its zero output is in a high state. It is, of course, desired to prevent the contents of byte register 1 from being altered during the duration of a scanning operation. The reset pulse that is applied to conductor 2016 is extended to the set terminal of flip-flop 2051 as well as to the reset terminal of the distributor. Therefore, at the same time the distributor is reset in response by this pulse, flip-flop 2051 is switched from a reset to a set state in which its one output becomes high and its zero output becomes low. The low on its zero output is extended to the upper inputs of AND gates 2028 to inhibit them so that no further signals may pass therethrough to byte register 1. The high on the one output of the flip-flop is extended to the upper inputs of AND gates 2052. The lower inputs of these AND gates are connected to output terminal 1 of the distributor. With the upper inputs of these AND gates partially enabled by the output of the flip-flop, any tape data that is received by the distributor during the scanning operation is applied to output terminal 1 and, in turn, to the lower inputs of both gates 2028 and 2052. Since gates 2028 are inhibited and gates 2052 are partially enabled, the data signals pass through the latter gates and into overflow register 2021–OV. The data remains in this register until the termination of the scanning operation when a restore pulse is applied by the processor to conductor 2025 extending to the reset (R) terminal of the flip-flop as well as to the upper inputs of AND gates 2029. This pulse switches the flip-flop back to its reset state in which its one output is low and its zero output is high. The resetting of the flip-flop inhibits gates 2052 and partially enables AND gates 2028 so that any signals subsequently applied to distributor output terminal 1 may pass through gates 2028 and 2054 and into byte register 1.

The application of the restore pulse to the upper inputs of AND gates 2029 permits the information now in the overflow register to pass through gates 2029, over conductors 2053, through OR gate 2054, to byte register 10. The information that is transferred from the overflow register to byte register 1 cannot be subsequently overriden by newly received information since the sequence of circuit operations that entered data into the overflow register also caused the distributor to advance from its position 1 to its position 2 when the second stage of the sequencer applied an advance pulse to conductor 2048. Therefore, the distributor is in its position 2 at the time the restore pulse is applied to enable AND gates temporarily 2029 so that the contents of the overflow register may be transferred to byte register 1. Following this transfer operation, the information from the subsequently read lines of the tape are entered into the remaining byte registers sequentially in the manner identical to that already described. Circuit 270 resets the byte register under control of the restore pulse on conductor 2025. Circuit 2071 resets the overflow register upon the reception of a reset pulse.

An understanding of the relationship between the various pulses generated by the processor and the sequencer may be facilitated at this time with reference to FIG. 5. Shown thereon are a plurality of clock pulses spaced apart from each other by an interval of 10 microseconds. Immediately following certain of the clock pulses is a series of three pulses spaced apart from each other by 1 microsecond. The three pulses following certain ones of the clock pulses comprise the output pulses generated by the sequencer in response to the reception of a clock pulse from gate 2041 when data is in the read register 2007. Although data may be read from a line of the tape and entered into read register 2007 at any time, the contents of the read register can be transferred via the distributor to a byte register only when a set of three pulses is generated by the sequencer. Conversely, data is not entered into a byte register upon the generation of each clock pulse, but instead, only in response to the generation of a clock pulse at the time the read register contains tape data.

Two reset pulses spaced apart from each other by a period of 5 milliseconds are shown on FIG. 5. The leftmost reset pulse resets the distributor after data has been entered into the byte registers under control of the clock pulses and sequencer output pulses shown to the left of the reset pulse. One hundred microseconds to the right of the first reset pulse is shown a scan pulse, and 100 microseconds to the right of that is shown a restore pulse. The 200 microsecond period between the reset and the restore pulse represents the time during which flip-flop 2051 is in a set state and, in turn, gates 2052 are enabled while gates 2028 extending to byte register 1 are inhibited. At this time, the distributor is in its position 1, as a result of the reset pulse, and any information it now receives from the read register is transmitted through gates 2052 and entered into the overflow register 2021–OV.

FIG. 5 illustrates a set of sequencer output pulses that control the entry of data into the overflow register during the 200 microsecond interval that flip-flop 2051 is in a set state. These pulses comprise the clock pulse and the set of three sequencer pulses immediately to the right of the leftmost scan pulse. The clock pulses shown intermediate the reset and the scan pulse represent the pulses generated by the clock during this 100 microsecond interval. Since no sequencer output pulses are shown following any of these clock pulses, this indicates that no data was present in the read register at the time these clock pulses were generated. However, the clock pulses and the set of three sequencer pulses shown immediately to the right of the first scan pulse indicates that information was then in the read register. This information is entered at this time into the overflow register rather than into byte register 1.

The leftmost restore pulse resets the flip-flop at the end of the first interrupt and restores the circuit to its normal state in which AND gates 2028 are partially enabled and AND gates 2052 are inhibited.

Each clock pulse followed by a set of the three sequencer pulses shown intermediate the first and second reset pulses represents the times during which data is transferred from the read register into an overflow or byte register during the next five millisecond interval. Five such sets of sequencer pulses are shown on FIG. 5. This indicates that five lines of the tape were read, entered into the read register, and transferred therefrom to the byte registers during the interval prior to the next data transfer interrupt. The scan pulse following the second reset pulse represents the beginning of the scanning operation for the second data transfer interrupt, and the restore pulse following this scan pulse represents the termination of the scanning interval. The lack of any sequencer output pulses intermediate the rightmost reset and restore pulses indicates that no data was present in he read register and transferred to the overflow register during the second data interrupt.

The following describes the manner in which the contents of the byte registers are read by the scanner and applied to the shift register. The scanner reads the contents of the byte registers sequentially beginning with the first register and, in so doing, applies to conductors 2018 the results of its scanning operation. Eight data conductors of path 2018 are extended to the input of shift register 2006 while all nine of the conductors (the eight data conductors plus the parity bit conductor) are extended to the input of the OR gate 2054. This gate may comprise either a 9 input OR gate or alternatively nine single input OR gates having a common output. The output of this gate, conductor 2060, constitutes a data present signal which is applied to the upper input of OR gate 2055. The output of this OR gate is extended via conductor 2056 to the lower input of the shift register as well as to the upper input of counter 2057. The lower input of the shift register is a shift control input, and the shift register steps all information therein one position to the left in response to the reception of each shift signal from conductor 2056.

The application to conductors 2018 of the contents of byte register 1 causes the information to be entered into the block 0 of the shift register and also generates a data present signal on conductor 2060. This signal passes through OR gate 2055 to advance counter 2057 one position as well as to cause the shift register to advance the newly entered data one position to the left to block 1.

Let it be assumed that five byte registers are found to be filled during the first interrupt and that signals representing the contents of these five registers are therefore applied sequentially, register by register, to conductors 2018. The signals representing the first data byte are entered into slot 0, and is then shifted to slot 1 as already described. Counter 2057 also advances one step at this time. The reception of the next four bytes of data sequentially enters each eight bit byte into slot 0 of the shift register and, by means of the data present signal on conductor 2056, shifts each byte of data in the shift register one step to the left and advances the counter 2057 on position. At the end of the reception, of the signals representing the contents of the five byte registers, shift register slots 1 through 5 are filled and the counter 2057 indicates a count of 5. Data never remains in shift register slot 0 more than a few microseconds since each data byte applied over conductors 2018 to shift register slot 0, is also applied to OR gates 2054 to generate a data present signal on conductor 2060 which, in turn, immediately generates a shift signal at the output of gate 2055. This signal is extended over conductor 2056 to shift the data currently in slot 0 one position to the left to slot 1.

The output of gate 2054 is also connected over conductor 2060 to a Divide-by-Five circuit 2061 which generates one output pulse in response to the reception of five input pulses. The output pulse of the Divide-by-Five circuit is applied to counter 2062 which counts the number of pulses it receives. Each output pulse of the divider signifies the reception of a complete tape entry i.e., five lines. Therefore, the setting of counter 2062 provides, over conductor path 2063, an indication to the processor of how many tape entries have been received by the shift register.

On each subsequent data interrupt, the contents of the filled byte registers in the data buffer are transferred to the shift register in the same manner as already described regardless of whether four, five, or six byte registers are found to be filled. Thus, on each interrupt, the contents of all filled byte registers are entered into the shift register, the counter 2057 is advanced one position for each byte received, and the divider 2061 and counter 2062 together keep the processor advised as to how many 40 bit tape entries are currently in the shift register.

In actual practice, all of the data stored on a reel of tape is not transferred on consecutive data transfer interrupts to the memory, but rather the transfer is effected by reading a plurality of entries (commonly referred to as a data block) and by transferring the information thereon to the shift register in the manner already described. The tape transport is then stopped by the application of a control signal to conductor 2012; the contents of the shift register are transferred to the processor; and the tape transport is again started and the next block of information is then read from the tape in the same manner as already described in the event the processor desires to enter additional information into memory.

The capacity of the shift register on FIG. 2B is such that it is equal to or exceeds the maximum quantity of data comprising a single block of tape entries. Thus, if the maximum size of a data block is assumed to be 20 entries, the shift register would then contain 101 slots, designated 0 through 100, in order to receive and store the 20 entries of five lines each.

The following describes the manner in which the data comprising a block of information is read out of the shift register and transmitted to the processor. In this connection, it should be remembered that although varying quantities of data may be received from the byte registers on each data transfer interrupt due to short term variations in the speed of the tape that nevertheless, each data block comprises a plurality of complete five line entries. Thus, the data in the shift register following the reception of a data block will comprise an integral number of complete entries, and the number of slots of the shift registers that will be filled will be a multiple of 5.

Each data block is separated a sufficient distance on the tape from each other block so that no information is received for 100 or 150 milliseconds following the reading of the last line of a block. This absence of information causes the scanner to encounter empty byte registers on at least two successive data transfer interrupts. As a result, no new data will be received by the shift register on successive interrupts and the counter 2062, which indicates the number of words currently in the shift register will not advance. The processor monitors the output of the counter and when it determines that the counter does not advance on two successive interrupts, it determines that the end of a block of data has been reached and applies a pulse to conductor 2012 to stop the tape transport.

Data is transmitted to the processor 40 bits at a time over path 2019 from the leftmost five slots of the shift register. It is possible that blocks of data having less than 20 entries will sometimes be encountered and, therefore, that all of slots 1 through 100 of the shift register will not always be filled following the reception of each data block. For example, it is possible that a block of data may contain only ten complete entries i.e., 50 lines. In that case, only slots 1 through 50 of the shift register would be filled at the time the tape transport is stopped by the processor. At this time, the processor knows from the information provided by counter 2062 how many tape entries have been received.

In order to describe fully the operation of the shift register control circuitry of FIG. 2B let it first be assumed that a block of data containing 20 tape entries has been read and entered into shift register. In this case, shift register slots 1 through 100 are filled and the processor is advised by counter 2062 that twenty 40-bit binary words are to be transferred from the shift register to the memory. The processor initiates the transfer operation by receiving and registering the first 40-bit word in response to the data signals applied to it via conductors 2019 from the five shift register slots 96 through 100. This information represents the first entry in the block of data that has just been read from the tape. Next, the processor applies five pulses to conductor 2058 extending the input of OR gate 2055. Each such pulse is passed through the OR gate, and is applied via conductor 2056 to the lower input of the shift register to advance the information therein five slots to the left. At this time, the information that was priorly in slots 91 through 95 (the second tape entry that was read) is advanced to slots 96 through 100. The new information in slots 96 through 100 is then transferred via conductors 2019 to the processor which, in turn, applies five pulses to conductor 2058 to transfer the information in the shift register five more places to the left.

The transfer of data from the shift register to the processor continues in the manner already described until each tape entry in the shift register is shifted to the left to slots 96 through 100, and, in turn, transmitted to the processor. the processor transfers each 40-bit word it receives to the memory in accordance with well-known techniques.

Next, let it be assumed that a block of data containing only ten five-line tape entries is read and entered into the shift register. In this case, only shift register slots 1 through 50 are filled, the processor determines from counter 2062 that only 10 entries have been read, and it applies a pulse to conductor 2067 in order to left adjust the data in the shift register. The pulse on conductor 2067 is applied to the start-input of the Push-to-the-Left circuit 2066. This circuit comprises a normally inactive oscillator which, once started in response to the reception of a start-pulse, generates and applies a series of output pulses to conductor 2059 until it receives a stop pulse from conductor 2065. Each pulse circuit by circuit 2066 is applied to conductor 2059 extending to the lower input of OR gate 2055. Each such pulse passes through the OR gate and appears on conductor 2056 which is connected to the lower input of the shift register and to the input of counter 2057. As a result, each pulse generated by circuit 2066 adjusts the information in a shift register one slot to the left and, at the same time, advances the counter 2057 one operative position. The pulsing of circuit 2066, continues until the data representing the first line of the first tape entry is advanced to the left to shift register slot 100. At that time, the counter 2057 will then indicate a count of 100. This count, which represents the capacity of the shift register, is detected by AND gate 2064 which then applies an output signal to conductor 2065 and, in turn, to the lower input of circuit 2066 to terminate its pulsing operation. The signal on conductor 2065 is also transmitted to the processor as an indication that the information in the shift register has been left adjusted and is now ready to be read out. The counter 2062 is still at a setting of 10 since only 10 tape entries were entries With the knowledge provided by counter 2062 that 10 words are in the shift register, and after being informed by the pulse on conductor 2065 that the information has been left adjusted in the shift register, the processor now transfers the data from the shift register to the memory by alternately reading out the leftmost five slots of the shift register and then leftmost adjusting the remaining data therein five more positions by the application of five pulses to conductor 2058. The processor continues to operate in this manner until it has read out of the shift register all of the 40 bit words specified by the current setting of counter 2062. At the end of the read out operation, the processor applies a reset pulse to conductor 2068 to reset counters 2062 and 2057. The entire system of FIGS. 2A and 2B is then in a reset or normal condition in which it stands ready to receive the next block of data read from the tape.

The system disclosed in FIGS. 2A and 2B requires that the shift register have the capacity to store all of the data contained in the largest block recorded on tape. Although the provision of a shift register having this capacity might be somewhat of a disadvantage, this is more than offset in many instances by the fact that the processor (1) may continue to perform its online duties after the shift register has received an entire data block, and (2) can return at its leisure to the task of transferring the data from the shift register to its memory. After this transfer is effected, the processor may once again start the tape transport and cause the next data block to be read and entered into the shift register. Thus, the advantage of the system of FIGS. 2A and 2B is that it gives the processor a two way control over the time at which tape data can be transferred to memory. First of all, the processor has control over the transfer operation in that it decides the time at which a pulse may be applied to conductor 2011 to start the tape transport. Secondly, once a data block is in the shift register, the processor controls the time at which the shift register contents are to be read out and transferred to the memory. If the transfer is to be effected immediately, the processor performs an alternate data read and leftmost adjust operation in response to the failure of counter 2062 to advance at the end of a data block or in response to the receipt of a ready signal on conductor 2065. If the transfer from the shift register is to be delayed because the processor is currently busy with more urgent tasks, the processor does not immediately respond and, instead, continues to perform its online functions until, at a time it selects, it later performs the alternate data read and leftmost adjust operations to transfer the data out of the shift register to the memory.

Description of FIG. 4

The system shown in FIG. 4 provides an alternative system embodying my invention in accordance with which a shift register of a lesser capacity, than that of FIG. 2B, may be used to transfer data from the byte registers to the processor. The elements on FIG. 4 corresponding to those on FIG. 2 are designated in a manner to facilitate an appreciation of the correspondence. Thus, shift register 4006 on FIG. 4 corresponds to shift register 2006 on FIG. 2.

Shift register 4006 receives the contents of the byte registers from the scanner on conductor 4018 in the same manner as shown on FIG. 2B for conductor 2018 and shift register 2006. The eight data bits representing the contents of a byte register are entered into slot 0 of the shift register. All nine bits from a byte register (the eight data bits plus the odds one parity bit) are gated through OR gates 4054 to provide a data present signal on conductor 4060. The signal applied to conductor 4060 for the first received byte shifts the eight bits just entered into slot 0 one position to the left to slot 1. Each pulse applied to conductor 4060 as a byte is received and is also applied to the Divide-by-Five circuit 4061. The remaining bytes are subsequently received over conductor 4018 in the same manner and each received byte is entered into the shift register by left adjusting its contents one position. Finally, after five bytes have been received, an output pulse is applied by the Divide-by-Five circuit 4061 to counter 4062 which, in response thereto, applies a signal to conductor 4063 extending to the processor to advise it that the five lines of a complete tape entry are in register slots 1 through 5. Upon the receipt of this signal, the processor then immediately reads the contents in the shift register via conductors 4019 and transfers the information to an appropriate word in memory 4004. Counter 4062 is reset by a signal from the processor on conductor 4068.

The embodiment of FIG. 4 requires that the processor promptly read the information in the shift register once it has received an output signal on conductor 4063 indicating the present of a full 40-bit word in shift register slots 1 through 5. This prompt action on the part of the processor is especially necessary on the interrupts for which six byte registers are filled. Prompt action by the processor is necessary in such instances in order that the first five lines of data received by the shift register and representing a complete tape entry may be read by the processor prior to the reception of the sixth byte. At the time the scanner applies the contents of byte register 6 to conductor 4018, the eight data bits of the byte are applied to shift register slot 0 and are immediately left adjusted to shift slot 1. Once this left adjustment is made, the contents of the shift register no longer represent a complete tape entry but instead represent the last four lines of a prior entry and the first line of a new entry. For this reason, it is necessary for the embodiment of FIG. 4 that the processor promptly respond to a signal on conductor 4063 and read out the contents of the shift register which at that time comprise a single tape entry.

The present specification has been simplified by diagrammatically disclosing the various elements of the system whose details comprise no portion of my invention and which are well known in the prior art.

It is to be understood that the above-described arrangements are but illustrative of the application of the principles of the invention. Numerous other arrangements may be devised by those skilled in the art without departing from the spirit and scope of the invention. For example, although my invention has been described in connection with tape entries in which the data is rearranged in the form of a specified number of lines and a specified number of data bits per line, it may be appreciated that the principles of my invention are equally applicable to the transfer of data arranged into formats other than that shown on the present drawing.

I claim:

1. In a system for transferring data from a first to a second storage medium, means for sequentially reading lines of data arranged in the form of plural line entries on said first medium, a plurality of byte registers, means responsive to said reading for entering the data read from each line of an entry into a different one of said byte registers, a shift register, means for periodically transferring the data from each of said byte registers sequentially into said shift register, and means for transferring the data comprising each entry as a single binary word from said shift register to said second storage medium.

2. The system of claim 1 in combination with means responsive to the reception by said shift register of all the data comprising an entry for initiating said transfer to said second medium.

3. The system of claim 1 in combination with means responsive to the reception by said shift register of a block of data comprising a predetermined number of entries for initiating said transfer of each entry in said block sequentially as a binary word to said second storage medium.

4. The system of claim 1 in which said means for entering comprises, a read register for temporarily storing on a one line at a time basis each line of data read from said first medium, a distributor having an input and a plurality of output positions, means for transferring each line of data received by said read register to the input of said distributor, means for individually connecting each of said byte registers to a different one of said distributor output positions, and control means responsive to the reception by said read register of the successive lines of data read from said first medium for causing said distributor to transfer the data comprising each line of an entry from said read register to a different one of said byte registers.

5. The system of claim 4 in which said means for transferring data into said shift register comprises a scanner, and control means for causing said scanner to apply the contents of the currently filled ones of said byte registers sequentially to said shift register.

6. In a system for transferring data on an interrupt basis from an offline storage medium to the memory of a processor operating in an online mode, means for sequentially reading lines of data arranged in the form of plural line entries on said medium, means responsive to the reading of each entry for converting the data comprising each entry from its plural line format to a single binary word of the same bit capacity, said processor being periodically effective to switch from an online to an interrupt state in which it may receive offline data, means for receiving a signal indicating an interrupt state of said processor, and means responsive to said interrupt signal for applying said converted binary word to said processor, said processor being responsive to each received word for entering it into a unique location in said memory.

7. The system of claim 6 in which said means for converting comprises, a plurality of byte registers, mean responsive to said reading for entering the data received from each line of an entry into a different one of said byte registers, a shift register, means for periodically transferring the contents of said byte registers sequentially into said shift register, and means for transferring the data comprising each entry as a single binary word from said shift register to said processor.

8. The system of claim 7 in which said means for entering comprises, a read register for temporarily storing on a one line at a time basis each line of data read from said medium, a distributor having an input and a plurality of output positions, means for transferring each line of data received by said read register to the input of said distributor, means connecting each of said byte registers to an individual one of said distributor output positions, and control means responsive to the reception by said read register of the successive lines of data read from said medium for causing said distributor to transfer the data comprising each line of an entry from said read register to a different one of said byte registers.

9. The system of claim 8 in which said means for transferring into said shift register comprises a scanner, and means interconnecting said processor and said scanner for causing said scanner to apply the contents of said byte registers sequentially to said shift register in response to the reception of scan control signals from said processor.

10. The system of claim 9 in combination with means responsive to the reception by said shift register of all the data comprising an entry for initiating said transfer to said processor.

11. The system of claim 9 in combination with means responsive to the reception by said shift register of a block of data comprising a predetermined number of entries for initiating said transfer of each entry in said block sequentially as a binary word to said processor.

12. In a system for transmitting data from a magnetic tape to the memory of a processor controlled system, means for sequentially reading lines of data arranged in the form of plural line entries on said tape, a read register for temporarily storing on a one at a time basis each line of data read from said tape, means for applying each line of data read from said tape to said read register, a distributor having a plurality of output positions, a plurality of byte registers, means for individually connecting each of said byte registers to a different one of said distributor output positions, control means responsive to the reception by said read register of the successive lines of data read from said tape for controlling said distributor to transfer the data comprising each line of an entry from said read register to different one of said byte registers, a scanner, a shift register, means including said scanner for periodically transferring the contents of said byte registers sequentially to said shift register, and means for transferring the data comprising each entry received by said shift register to said memory in parallel form as a single binary word.

13. The system of claim 12 in combination with, an input on said distributor, gating means connecting an output of said read register with said input of said distributor, a source of clock pulses, means responsive to the generation of a clock pulse concurrent with the presence of a line of data in said read register for generating a sequence of pulses, means responsive to the generation of the first pulse of a sequence for gating the current contents of said read register to the input of said distributor, said distributor normally being in a reset position in which the data applied to its input is passed therethrough to a first one of its output positions and to the byte register connected thereto, means responsive to the generation of a second pulse of a sequence for advancing the distributor one operative position so that its input is connected to a next one of its output positions and to the byte register connected to said next position and means responsive to the generation of a third pulse of a sequence for resetting said read register prior to its reception of the next line of data read from the tape.

14. The system of claim 13 in combination with means for resetting said distributor to its reset position prior to the transfer of the contents of said byte registers to said shift register, and means for preventing any data from being entered into one of said byte registers while said scanner is transferring the contents of said byte registers sequentially to said shift register.

15. The system of claim 14 in which said means for preventing comprises, an overflow register, steering means, means including said steering means responsive to the resetting of said distributor for entering into said overflow register any line of data then received form said read register by said distributor, and means effective subsequent to the transfer of the contents of said byte registers to said shift register for transferring the contents of said overflow register to the byte register connected to the reset position of said distributor.

16. The system of claim 14 in which said means for transferring data to said memory comprises, a word counter, means for advancing said counter one position for every *n* lines of data received by said shift register where *n* = the number of lines in a complete tape entry, and means connecting the output of said word counter to said processor for providing an indication of the number of words currently stored within said shift register.

17. The system of claim 16 in combination with a second counter, means for advancing said second counter one position for each line of data received by said shift register, means responsive to the reading of a complete data block having a lesser number of words than the capacity of said shift register for adjusting the information in said shift register towards its output end, means for advancing said second counter one position as the data in said shift register is adjusted each step, means including said second counter for providing an indication to said processor when the information in said shift register is fully adjusted towards its output end, and means operable under control of said processor for transferring said contents of said shift register to said processor, said processor being effective to enter the data it receives into said memory.

18. The system of claim 14 in which said means for transferring the data comprising each entry received by said shift register to said memory comprises, a counter, means for advancing said counter one position for each *n* lines of data received by said shift register where *n* = the number of lines in a complete tape entry, and means interconnecting said counter and said processor for signifying the presence of a complete tape entry in said shift register, said processor being responsive to said signifying for transferring the contents of said shift register to said memory.

19. In a system for transmitting data from a magnetic tape to the memory of a processor controlled system, means for sequentially reading lines of data arranged in the form of plural line entries on said tape, a distributor having a plurality of output positions, a plurality of byte registers, means for individually connecting each of said byte registers to a different one of said distributor output positions, means responsive to the reading of the successive lines of data on said tape for causing said distributor to enter the data comprising each line of an entry into a different one of said byte registers, and means for periodically transferring the data comprising each entry from said byte registers to said processor, said processor being effective to enter the data it receives into said memory.

20. The system of claim 19 in which said means for transferring comprises, a shift register, means for periodically transferring the contents of said byte registers sequentially into said shift register, and means responsive to the receipt of said contents by said shift register for transferring the data comprising each entry as a single binary word.

21. In a system for transmitting data from a magnetic tape to the memory of a processor controlled system, means for sequentially reading lines of data arranged in the form of plural line entries on said tape, a read register for temporarily storing on a one at a time basis each line of data read from said tape, means for applying each line of data read from said tape to said read register, a distributor having a single input and a plurality of output positions, a plurality of byte registers, means for individually connecting each of said byte registers to a different one of said distributor output positions, means for transferring each line of data received by said read register to the input of said distributor, means responsive to the reception by said read register of successive lines of data read from said tape for causing said distributor to enter the data comprising each line of an entry into a different one of said byte registers, means for periodically transferring said data out of said byte registers sequentially, and means responsive to said last named transfer for entering the data comprising each entry into said memory in parallel form as a single binary word.

22. The system of claim 21 in combination with, an input on said distributor, gating means connecting an output of said read register with said input of said distributor, a source of clock pulses, means responsive to the generation of a clock pulse concurrent with the presence of a line of data in said read register for generating a sequence of pulses, means responsive to the generation of the first pulse of a sequence for gating the current contents of said read register to the input of said distributor, said distributor normally being in a reset position in which the data applied to its input is passed therethrough to a first one of its output positions and to the byte register connected thereto, means responsive to the generation of a second pulse of a sequence for advancing the distributor one operative position so that its input is connected to a next one of its output positions and to the byte register connected to said next position and means responsive to the generation of a third pulse of a sequence for resetting said read register prior to its reception of the next line of data read from the tape.